(12) United States Patent
Zaid et al.

(10) Patent No.: US 11,042,816 B2
(45) Date of Patent: Jun. 22, 2021

(54) VEHICLE ACCESS CONTROL SERVICES AND PLATFORM

(75) Inventors: Sam Zaid, Ottawa (CA); Vijai Anma, Seattle, WA (US); Elliot Kroo, Palo Alto, CA (US); Michael Lee Crogan, Palo Alto, CA (US)

(73) Assignee: Getaround, Inc., San Francisco, CA (US)

( * ) Notice: Subject to any disclaimer, the term of this patent is extended or adjusted under 35 U.S.C. 154(b) by 0 days.

(21) Appl. No.: 12/914,839

(22) Filed: Oct. 28, 2010

(65) Prior Publication Data

US 2011/0112969 A1 May 12, 2011

Related U.S. Application Data

(60) Provisional application No. 61/256,647, filed on Oct. 30, 2009.

(51) Int. Cl.
*G06Q 10/02* (2012.01)
*H04W 4/02* (2018.01)
(Continued)

(52) U.S. Cl.
CPC ............ *G06Q 10/02* (2013.01); *G06F 21/35* (2013.01); *G06Q 30/0645* (2013.01);
(Continued)

(58) Field of Classification Search
CPC . H04B 1/38; H04Q 1/00; G06Q 30/00; G06F 7/04; B60R 25/00; B60R 25/10; G08G 1/09; H04N 7/18
(Continued)

(56) References Cited

U.S. PATENT DOCUMENTS 6,961,858 B2 * 11/2005 Fransdonk .............. G06F 21/10
380/281
7,366,677 B1  4/2008 Liu et al.
(Continued)

FOREIGN PATENT DOCUMENTS

CN      1492346      4/2004
CN      1581191      2/2005
(Continued)

OTHER PUBLICATIONS

Etherington, ZipCar: Car Sharing/Renting With Your iPhone, Jun. 9, 2009, http://gigaom.com/apple/zipcar-car-sharingrenting-with-your-iphone/.*
(Continued)

*Primary Examiner* — John W Hayes
*Assistant Examiner* — Nakia Leffall-Allen
(74) *Attorney, Agent, or Firm* — Van Pelt, Yi & James LLP

(57) ABSTRACT

Vehicle access control is disclosed. In various embodiments, a vehicle reservation from a wireless communication device is received, the vehicle reservation is authenticated, and access to the vehicle is provided after authenticating the vehicle reservation. In various embodiments, a system for vehicle access control includes a vehicle access control component that is configured to provide access to a vehicle and a communication interface for communication with a wireless communication device, a communication interface for communication with a wireless communication device. Access to the vehicle is provided when a vehicle reservation is received from the wireless communication device.

36 Claims, 8 Drawing Sheets

(51) Int. Cl.
   *G06Q 30/06* (2012.01)
   *G06F 21/35* (2013.01)
   *G06Q 50/30* (2012.01)
   *H04W 12/08* (2021.01)
   *G07C 9/00* (2020.01)
   *H04W 12/50* (2021.01)
   *H04W 4/46* (2018.01)
   *H04W 4/029* (2018.01)
   *B60R 25/20* (2013.01)
   *H04L 29/06* (2006.01)

(52) U.S. Cl.
   CPC ......... *G06Q 50/30* (2013.01); *G07C 9/00571* (2013.01); *H04W 4/027* (2013.01); *H04W 12/08* (2013.01); *H04W 12/50* (2021.01); *B60R 25/20* (2013.01); *G07C 9/00857* (2013.01); *H04L 63/0853* (2013.01); *H04W 4/029* (2018.02); *H04W 4/46* (2018.02)

(58) Field of Classification Search
   USPC .............. 340/5.2, 5.72, 825.28, 904, 426.24; 348/149; 455/557; 705/14.25
   See application file for complete search history.

(56) References Cited

U.S. PATENT DOCUMENTS

| | | | |
|---|---|---|---|
| 7,609,174 B2* | 10/2009 | Tengler | G08G 1/20 340/901 |
| 2001/0041956 A1* | 11/2001 | Wong et al. | 701/36 |
| 2002/0147931 A1* | 10/2002 | Liu | G06F 1/3203 713/300 |
| 2002/0186144 A1* | 12/2002 | Meunier | G07B 15/00 340/4.6 |
| 2003/0034873 A1* | 2/2003 | Chase | G06Q 10/02 340/5.2 |
| 2003/0052796 A1* | 3/2003 | Schmidt | G01S 5/0027 340/905 |
| 2003/0208386 A1* | 11/2003 | Brondrup | G06Q 10/02 705/5 |
| 2004/0039919 A1 | 2/2004 | Takayama | |
| 2005/0070336 A1 | 3/2005 | Tamura | |
| 2005/0154873 A1* | 7/2005 | Cam-Winget | H04L 63/0435 713/150 |
| 2006/0079182 A1 | 4/2006 | Matsuda | |
| 2006/0179452 A1* | 8/2006 | Amodeo et al. | 725/25 |
| 2007/0089168 A1 | 4/2007 | Wang et al. | |
| 2007/0200671 A1* | 8/2007 | Kelley | B60R 25/257 340/5.72 |
| 2007/0285209 A1* | 12/2007 | Heusi et al. | 340/5.23 |
| 2008/0066186 A1 | 3/2008 | Hammes | |
| 2008/0200209 A1* | 8/2008 | Cahoon | B60R 25/045 455/557 |
| 2008/0287074 A1 | 11/2008 | Grunhold | |
| 2008/0312797 A1* | 12/2008 | Takehisa | 701/49 |
| 2009/0031368 A1* | 1/2009 | Ling | H04N 21/222 725/87 |
| 2009/0121850 A1* | 5/2009 | Tanaka | B60R 25/102 340/426.24 |
| 2009/0219135 A1* | 9/2009 | Harvey | B60R 25/2018 340/5.82 |
| 2009/0251279 A1 | 10/2009 | Spangenberg et al. | |
| 2009/0319356 A1* | 12/2009 | Spitzer | G06Q 20/1235 705/14.25 |
| 2010/0073125 A1* | 3/2010 | Alrabady et al. | 340/5.2 |
| 2010/0157061 A1* | 6/2010 | Katsman | G07C 5/0866 348/149 |
| 2010/0201536 A1* | 8/2010 | Robertson et al. | 340/686.6 |
| 2011/0060480 A1* | 3/2011 | Mottla et al. | 701/2 |

FOREIGN PATENT DOCUMENTS

| | | |
|---|---|---|
| CN | 1588476 | 3/2005 |
| CN | 101287157 | 10/2008 |
| JP | 2002290509 | 10/2002 |
| JP | 200358795 | 2/2003 |
| JP | 2005-81995 | 3/2005 |
| JP | 2005081995 | 3/2005 |
| JP | 2005-165568 | 6/2005 |
| JP | 2006009333 | 1/2006 |
| JP | 2007-32134 | 2/2007 |
| JP | 2007113245 | 5/2007 |
| JP | 2007183749 | 7/2007 |
| JP | 2007243571 | 9/2007 |
| JP | 2007534544 | 11/2007 |
| JP | 2008072160 | 3/2008 |
| JP | 2008-117076 | 5/2008 |
| KR | 10-2007-0006128 | 1/2007 |
| KR | 20070006128 | 1/2007 |
| KR | 10-0772609 | 11/2007 |
| KR | 20080041971 | 5/2008 |
| KR | 20090035096 | 4/2009 |
| WO | 2008050243 | 5/2008 |
| WO | 2008140529 | 11/2008 |
| WO | 2009035099 | 3/2009 |

OTHER PUBLICATIONS

Ron White, How Computers Work, Oct. 15, 2003, Que Publishing, 7th Ed, p. 4.*
Ron White, How Computers Work, Oct. 15, 2003, Que Publishing, 7th Ed, p. 4. (Year: 2003).*
Menezes et al., Handbook of Applied Cryptography, Chapter 10: Identification and Entity Authentication, In: Handbook of Applied Cryptography, CRC Press Series on Discrete Mathematics and It's Applications, Jan. 1997, pp. 385-424.
Xu et al., Security Issues in Privacy and Key Management Protocols of IEEE 802.16, Proceedings of the 44th Annual Southeast Regional Conference on ACM-SE 44, Oct. 3, 2006, pp. 113-118.

* cited by examiner

VEHICLE ACCESS CONTROL SERVICES AND PLATFORM

CROSS REFERENCE TO OTHER APPLICATIONS

This application claims priority to U.S. Provisional Patent Application No. 61/256,647 entitled WIRELESSLY TETHERED COMMUNICATION SERVICES AND PLATFORM filed Oct. 30, 2009 which is incorporated herein by reference for all purposes.

BACKGROUND OF THE INVENTION

Car sharing is a model of car rental where people rent cars for short periods of time, often by the hour. They are attractive to customers who make only occasional use of a vehicle, as well as others who would like occasional access to a vehicle of a different type than they use day-to-day. The organization renting the cars may be a commercial business or the users may be organized as a democratically-controlled company or public agency. Many major cities have both commercial and non-profit companies providing car sharing services.

Car sharing differs from traditional car rentals in various ways. For example, a car sharing service can include one or more of the following characteristics: (a) car sharing is not limited by office hours, (b) reservation, pickup and return can be self-service, (c) vehicles can be rented by the hour, as well as by the day, (d) users are members and have been pre-approved to drive (background driving checks have been performed and a payment mechanism has been established), (e) vehicle locations are distributed throughout the service area, and often located for access by public transport, (f) insurance and fuel costs are included in the rates, and (g) vehicles are not serviced (cleaned, petrol filled up) after each use.

BRIEF DESCRIPTION OF THE DRAWINGS

Various embodiments of the invention are disclosed in the following detailed description and the accompanying drawings.

DETAILED DESCRIPTION

Figure 1:
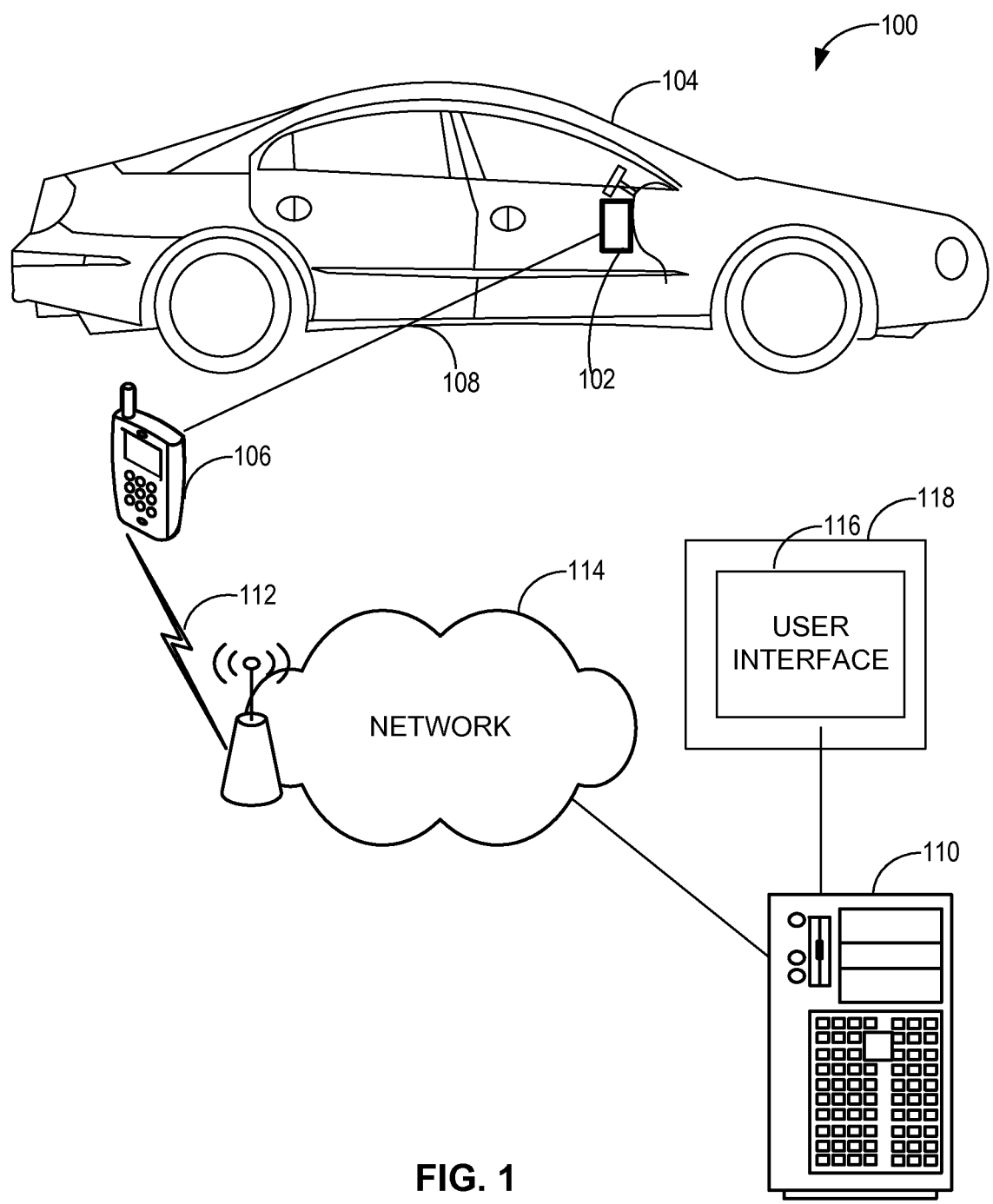
FIG. 1 is a block diagram illustrating an embodiment of a system for vehicle access control in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Car sharing companies and services typically require installation of proprietary or off-the-shelf Automatic Vehicle Location (AVL) hardware in their vehicles to automate the process of sharing cars. In addition to typical AVL hardware, car sharing generally requires each user to carry an identification card that is used to unlock a car that includes the AVL hardware. In particular, identification, authorization, and access typically involve giving each user a unique identification card. Each vehicle is then equipped with an Radio-frequency identification (RFID) or Near Field Communication (NFC) reader ("card reader") capable of reading the identification code on the device. The card reader is integrated into the AVL hardware and communicates directly with the Automatic Vehicle Locator Microprocessor Unit (AVL MPU). When the card is brought into proximity of the reader, the user's identification code is captured and transmitted over-the-air to the back-end system. If the user is authorized, the MPU actuates the door locks through the Bus Adapter and unlocks the car doors. When the user returns the car, he/she again swipes the card in proximity of the card reader to lock the car and end the rental transaction. Billing and reservation status are automatically updated and transmitted to the system back-end.

The current approaches for car sharing have various limitations. A unique identification card or physical access card/key needs to be issued to each user, making it inconvenient to grant or gain car access for new users who have not yet obtained such a card/key. The hardware component (e.g., AVL hardware) in the car must also be equipped with cellular or satellite communication capability, and the car must stay within the cellular or satellite access range for the current car access control systems to communicate with central server to update access control information and process vehicle access requests. However, cellular and satellite communication service fees can be expensive. Also, if the car is out of satellite communication range, such as in an underground parking garage, or downtown in a city with major high rises, or other locations, this can prevent proper authorization to the central server to verify granting of access to the vehicle and to receive the latest car access control information with minimum latency. In addition, the satellite communication can completely drain the car battery, particularly when the car is parked for a long period of time. Therefore, an improved way for providing car sharing services is needed.

Overview of Terminology

General

Car: Car is used synonymously with vehicle in the body of this patent. As used herein, car should be understood to include cars, buses, RVs, bikes, scooters, boats, and/or any other form of vehicular transportation.

Wireless Communication and Networks

GSM: Global System for Mobile communications (GSM) is a popular standard for mobile phones. It is a second-generation (2G) mobile standard and uses digital channels for both speech and signaling. For example, GSM includes data transmission capability through the General Packet Radio Service (GPRS) and Enhanced Data rates for GSM Evolution (EDGE) standards.

SMS: Short Message Service (SMS) is a communication service standardized in the GSM mobile communication system, using standardized communications protocols allowing the interchange of short text messages between mobile telephone devices. SMS text messaging is currently the most widely used data application on the planet, with approximately 2.4 billion active users, or approximately 74% of all mobile phone subscribers sending and receiving text messages on their phones.

UMTS: Universal Mobile Telecommunications System (UMTS) is a third-generation (3G) mobile telecommunications technology that builds upon concepts from the GSM standard. Most UMTS handsets also support the GSM standard, allowing seamless dual-mode operation.

HSDPA: High-Speed Downlink Packet Access (HSDPA) is an enhanced 3G mobile telephony communications protocol which enables faster data transfer speeds over UMTS networks.

LTE: Long Term Evolution (LTE) is a standard for fourth-generation (4G) mobile telecommunications standard designed to increase the capacity and speed of mobile telephone networks. LTE builds on UMTS to create an all-IP flat networking architecture with low latency and high data transmission rates.

Bluetooth: Bluetooth is an open wireless protocol for exchanging data over short distances from fixed and mobile devices, creating personal area networks (PANs). It was originally conceived as a wireless alternative to RS-232 data cables. It can connect several devices, overcoming problems of synchronization.

Wi-Fi: As used herein, Wi-Fi generally refers to the group of IEEE 802.11 standards for over-the-air modulation techniques that use the same basic protocol. Wi-Fi is used create Wireless Local Area Networks for computer communications.

Tethering: Tethering describes using some type of mobile device to gain Internet access on another device. Tethering works by connecting a device that can access the Internet, to another device that cannot connect directly. This can be done through a wireless technology (e.g., Bluetooth or 802.11 Wi-Fi) or using direct attach cables (e.g., USB), allowing the device without built-in access to connect to the Internet (e.g., over HSDPA), using the connected device as a modem.

Mobile handset/Smart phone: A Mobile Handset generally refers to a mobile device offering various of the advanced capabilities of a personal computer, such as email, high-speed Internet access, audio and video capabilities, a rich visual interface, advanced interaction techniques (e.g., multi-touch), and/or GPS functionality. As used herein, Mobile Handset should be understood to include smart phones, Internet-connected Mobile Handsets, smartbooks, netbooks, any other multi-function mobile handset that supports wireless connectivity, and any form of multi-function phone (e.g., including NFC-enabled phones).

Near Field Communication (NFC): A short-range wireless communication technology that enables the exchange of data between devices over about a 4 inch distance. NFC combines the interface of a smartcard and a reader into a single device. An NFC device can communicate with both existing ISO/IEC 14443 smartcards and readers, as well as with other NFC devices. It is compatible with existing contactless infrastructure already in use for public transportation and payment. NFC is primarily aimed at usage in mobile phones.

Radio-Frequency IDentification (RFID): Usually implies attaching an RFID tag applied to a product, animal, or person for the purpose of identification and tracking using radio waves.

Virtual-Private Network (VPN): A computer network where some of the links between nodes are carried by shared connections or virtual circuits through some larger network (e.g., the Internet). This is in contrast to a private network where all links between nodes are not shared. VPNs are often utilized with authentication and content encryption to secure communications through the public Internet.

Layer 2 Tunneling (L2TP, L2CAP Tunneling): Tunneling in a computer network involves wrapping lower level protocols (e.g., Link Layer) inside of higher level protocols (e.g., Transport Layer) to extend and virtualize the reach of the Link Layer. This is often done to bridge incompatible networks or to provide a secure path through an untrusted network.

Ad-hoc networks: A decentralized wireless network where each node forwards data for other nodes, and where the determination of forwarding nodes is made dynamically based on connectivity. As used herein, a Mobile Ad-hoc Network (MANET) refers to an ad-hoc network composed of interconnected mobile devices. As used herein, a Vehicular Ad-hoc Network (VANET) refers to an ad-hoc network composed of interconnected vehicles, mobile devices, and roadside equipment.

ZigBee: ZigBee is a specification for a suite of high level communication protocols using small, low-power digital radios based on the IEEE 802.15.4-2003 standard for Low-Rate Wireless Personal Area Networks (LR-WPANs), such as wireless light switches with lamps, electrical meters with in-home-displays, consumer electronics equipment via short-range radio. The technology defined by the ZigBee specification is intended to be simpler and less expensive than other WPANs, such as Bluetooth. ZigBee is targeted at radio-frequency (RF) applications that require a low data rate, long battery life, and secure networking IEEE 802.11s: IEEE 802.11s is a draft IEEE 802.11 amendment for mesh networking, defining how wireless devices can interconnect to create a WLAN mesh network, which may be used for static topologies and ad-hoc networks.

802.11 is a set of IEEE standards that govern wireless networking transmission methods. They are commonly used today in their 802.11a, 802.11b, 802.11g, and 802.11n versions to provide wireless connectivity in the home, office and some commercial establishments.

Automotive Control Systems

ECU: An electronic control unit (ECU) is any embedded system that controls one or more subsystems in a motor vehicle. Modern motor vehicles have up to 80 ECU's and often the collectively referred to as the ECU.

MPU/MCU: A microprocessor unit (MPU) is a small-form computer processing unit on a single integrated circuit (IC) capable of executing computer code. Desktop computer chips take the form of microprocessors today. A microcontroller unit (MCU) is a special-purpose, scaled down, and simple form of microprocessor. MCUs are typically used in small form factor devices, dedicated, and specialized applications.

CAN-bus: Controller-area network (CAN or Can-bus) is a vehicle bus standard designed to allow microcontrollers and devices (e.g., sensors, actuators, and control units) to communicate with each other within a vehicle without a host computer. CAN is a multi-master serial bus standard and uses a message-based protocol for connecting multiple electronic control units (ECUs) together.

LIN-bus: The LIN-Bus (Local Interconnect Network) is a vehicle bus standard or computer networking bus-system used within current automotive network architectures. The LIN specification is enforced by the LIN-consortium, with the first version being 1.1, released in 1999. Since then, the specification has evolved to version 2.1 to meet current networking needs.

The LIN bus is a small and slow network system that is used as a lower cost sub-network of a CAN bus to integrate intelligent sensor devices or actuators in today's cars. Recently LIN may be used also over the vehicle's battery power-line with a special DC-LIN transceiver.

Example actuators and car components most likely to be controlled by the LIN-bus (e.g., where high speed control, redundancy, and fault tolerance are not required) include:
  a. Roof Sensor, light sensor, light control, sun roof
  b. Steering Wheel Cruise control, wiper, turning light, climate control, radio
  c. Seat Seat position motors, occupant sensors, control panel
  d. Engine Sensors, small motors
  e. Climate Small motors, control panel
  f. Door Mirror, central ECU, mirror switch, window lift, seat control switch, door lock OBD: On-Board Diagnostics (OBD) refers to a vehicle's self-diagnostic and reporting capability. OBD systems give the vehicle owner or a repair technician access to state of health information for various vehicle sub-systems.

Modern OBD implementations use a standardized fast digital communications port to provide real-time data in addition to a standardized series of diagnostic trouble codes, or DTCs, which allow one to rapidly identify and remedy malfunctions within the vehicle.

The OBD-II specification provides for a standardized hardware interface—the female 16-pin (2×8) J1962 connector. The OBD-II connector is nearly always located on the driver's side of the passenger compartment near the center console. SAE J1962 defines the pinout of the connector standard.

OBD-II provides access to numerous data from the ECU and offers a valuable source of information when troubleshooting problems inside a vehicle. The SAE J1979 standard defines a method for requesting various diagnostic data and a list of standard parameters that might be available from the ECU. The various parameters that are available are addressed by "parameter identification numbers" or PIDs which are defined in J1979. A list of basic PIDs, their definitions, and the formulae to convert raw OBD-II output to meaningful diagnostic units, is contained in the OBD-II PID specification.

Keyless entry system: A system that remotely unlocks and grants access to automobiles without the use of a physical car key. Enables power door locks to be locked or unlocked from several feet away without any physical contact to the car.

Most remote key systems work by transmitting a command along with a pseudo-random code on a pre-programmed radio frequency. Each time the lock or unlock button on the remote is pressed, the next number in the pseudo-random sequence is transmitted to the vehicle along with the desired command (e.g., lock or unlock doors).

If the vehicle ECU recognizes the transmitted code as valid, the command is accepted. In practice, the vehicle ECU will accept any of the next 256 codes in the pseudo-random sequence and will synchronize itself with the remote key by storing the last valid transmitted code in memory.

KeeLoq: KeeLoq is a proprietary hardware-dedicated NLFSR-based (Non-linear Feedback Shift Register) block cipher for generating a code hopping sequence. KeeLoq is used in the majority of keyless entry systems by such companies as Chrysler®, Daewoo®, Fiat®, GM®, Honda®, Toyota®, Volvo®, VW®, Clifford®, Shurlok®, Jaguar®, and other automotive companies.

Keyless Go system: An automotive technology that allows the driver to automatically lock and unlock a vehicle without pressing any buttons on the remote key. Once inside the vehicle, Keyless Go also enables the driver to start and stop the engine without using a key. Driver identification and automatic functions are accomplished using a transponder built into the key. The system works by having a series of LF (low frequency 125 kHz) transmitting antennas both inside and outside the vehicle. The external antennas are located in the door handles. When the vehicle is triggered either by pulling the handle or touching the handle an LF signal is transmitted from the antennas to the key. The key becomes activated if it is sufficiently close and it transmits its ID back to the vehicle via RF (e.g., RF>300 MHz) to a receiver located in the vehicle. If the key has the correct ID the PASE module unlocks the vehicle.

Automatic Vehicle Location (AVL)

GPS: The Global Positioning System (GPS) is a U.S. space-based global navigation satellite system. It generally provides reliable positioning, navigation, and timing services to worldwide users on a continuous basis in nearly all weather, day and night, and almost anywhere on or near the Earth in which there is effective satellite communication.

AVL: Automatic vehicle location is a means for automatically determining the geographic location of a vehicle and transmitting the information to a requester. Geographic positioning is most commonly determined using satellite positioning (e.g., GPS) or wireless locating systems (e.g., RTLS).

After position capture, data transmission occurs over satellite, terrestrial, or cellular communications networks. Most commonly used are cellular networks that transmit data over SMS, GPRS, or EDGE.

AVL hardware: In-vehicle hardware is required to support AVL systems. Hardware components commonly installed in a vehicle, generally including the following devices:

a. A GPS unit for accurate and real-time geo-location capture.

b. A telemetry device for transmitting captured position data over the desired medium (satellite, terrestrial radio, cellular). A common implementation choice is a GSM modem transmitting data over either SMS or GPRS/EDGE.

c. A hardware interface to the vehicle control bus and primary ECU for capturing vehicle sensor readings (e.g., RPMs, engine status) and trigger vehicle actuators (e.g., Door locks). This typically leverages SAE standards such as CAN-bus and/or LIN-bus.

d. An MPU (microprocessor unit) or MCU (microcontroller unit) to handle computer communications, store data, and coordinate the activities the full AVL system.

e. A backup battery that powers the AVL hardware components when the car is turned off to avoid draining the main car battery.

Cryptography and Communications Security

Public-key Cryptography: An asymmetric cryptographic approach distinguished by its use of two keys: a public-key and a private-key. If the private-key used to encrypt then the public-key must be used to decrypt the message, and vice-versa.

Symmetric-key Cryptography: A set of encryption methods in which both the sender and receiver share the same secret key.

Description of Example Embodiments

Techniques for car access control are disclosed herein. In various embodiments, a method for vehicle access control includes receiving a vehicle reservation from a wireless communication device and providing vehicle access based on the received reservation. In various embodiments, a system for vehicle access control includes a vehicle access control component that is configured to provide access to a vehicle and a communication interface for communication with a wireless communication device, where access to the vehicle is provided when a vehicle reservation is received from the wireless communication device.

In various embodiments, providing vehicle access includes opening the vehicle door, allowing the start of vehicle engine, and/or allowing actuation of various other vehicle functions.

In various embodiments, the vehicle reservation includes a reservation for a specified time period. In various embodiments, the vehicle reservation includes a reservation time slot and vehicle identifier identifying the vehicle. In various embodiments, the reservation includes an unlimited time period for access to the vehicle for example for the vehicle owner. In various embodiments, the vehicle reservation includes a vehicle rental reservation.

In various embodiments, the reservation is included in a verified communication. In various embodiments, the reservation is included in an encrypted communication. In various embodiments, the vehicle reservation is encrypted using a public key-private key scheme. In various embodiments, the vehicle reservation is included in a secured communication that is wrapped in multiple layers of encryption that requires decryption. In various embodiments, decryption is required at each communication relay station to authenticate the vehicle reservation. In various embodiments, the reservation is shared among members of a group and/or entity such as family and corporation.

In various embodiments, receiving the vehicle reservation from the wireless communication device can be accomplished via a wireless communication link such as a short-range wireless communication range or via a wired communication link such as a USB connection.

In various embodiments, the received vehicle reservation is booked at a central server via a user interface displayed on a computing device. In various embodiments, the reservation is booked through one or more social networking websites, such as FourSquare® and Facebook®. A user must first log into the social networking website before he/she can view the advertisement and make reservation. For example, a tracking mechanism can be established to track group member driving history and reputation and allow the vehicle owner to have better control over the type of user the owner is lending/sharing/renting vehicle to.

In various embodiments, the wireless communication device from which the reservation is received can be any suitable wireless communication device that supports long-range wireless connectivity into a wireless network such as various cellular and satellite network such as GSM, SMS, UMTS, HSPA, and/or LTE. Examples of which include a smart phone, mobile handset, PDA, smartbook, netbook, and laptop. In various embodiments, the wireless communication device is connected to a data network via a long-range wireless communication link such as cellular communication link and satellite communication link and receives the vehicle reservation from a central server in the data network.

In various embodiments, the wireless communication device is in the form of a USB puck in which vehicle reservation information can be downloaded to the USB puck from a computing device via a wired connection to the computing device (e.g., a USB connection by plugging the USB puck into a USB port of the computing device). For example, a user can connect their USB puck to their laptop or other computing device (e.g., in wireless or wired network communication with the Internet). The user can then access an online reservation system using a browser or other communication interface. The user can then make a reservation online. The reservation is downloaded to the user's laptop and stored on the USB puck. In various embodiments, the USB puck includes short-range wireless communication interface to communicate with a vehicle access component coupled to a vehicle. In various embodiments, the USB puck includes a physical adaptor configured to communicate with the vehicle access component via a wired connection.

FIG. 1 is a block diagram illustrating an embodiment of a system 100 for vehicle access control in accordance with some embodiments. In various embodiments, the system for vehicle access control includes a vehicle access component 102 configured to provide access to a vehicle 104 when a vehicle reservation is received from a wireless communication device 106 via a communication link 108.

The wireless communication device is connected to a data network 114 via a long-range wireless communication link 112, such as cellular communication link and/or satellite communication link. The vehicle reservation is received by the wireless communication device 106 from a central server 110 sitting on a data network 114 via a long-range wireless communication link 112 or a wired link (not shown).

In various embodiments, the wireless communication device includes a vehicle reservation application or other software function (e.g., an iPhone® or Droid application) that enables a vehicle user (e.g., renter and owner) to communicate with backend server(s) (e.g., an online vehicle reservation system) to (a) advertise or announce the location of the vehicle, (b) advertise or announce the location of the user, (c) advertise or announce when the vehicle will be available for sharing (e.g., vehicle owner announces when the vehicle is available for sharing, and/or vehicle user announcing when the vehicle is returned and is available for sharing by others), and/or (d) retrieving a list of nearby vehicles available for sharing.

In various embodiments, the vehicle reservation system includes a "check-in" mechanism that uses a location tracking capability (e.g., GPS) of the wireless communication device to retrieve the vehicle user's location and/or the vehicle's location. In various embodiments, the location of the wireless communication device is used as an indicator of the location of the vehicle user and/or the location of the vehicle the vehicle user has possession of (e.g., during a reservation period). In various embodiments, the GPS location of the wireless communication device is transmitted to backend server(s) (e.g., the online vehicle reservation system) to retrieve a list of nearby places (e.g., Hotel, Airport, Office, Parking log, and/or other places). The vehicle user can select the place or create a new place identity in the system if one does not already exist (e.g., to indicate where the vehicle and/or user is located) and inputs the vehicle's available schedule. In various embodiments, the "check-in" mechanism is implemented using a "social check-in" mechanism in which the vehicle reservation system is configured to publish and/or share the "check-in" information through one or more social networks, such as Facebook® and/or Twitter®. In some embodiments, the vehicle reservation system is configured to retrieve the list of nearby places (e.g., that the vehicle will be located or available for sharing) and can be augmented or retrieved directly from a social network, such as Facebook® and Foursquare®.

In various embodiments, the vehicle reservation system allows a vehicle user and owner to dynamically send out a vehicle request and/or update the server(s) (e.g., online vehicle reservation system) of various vehicle related information such as vehicle availability and vehicle location. In various embodiments, the dynamically updated vehicle location and availability information are used by the backend vehicle sharing system to register the vehicle as available for sharing. This enables the vehicle to be rented from a dynamic set of locations (e.g., updated dynamically through communications with the backend server) that were not previously registered on the vehicle sharing network.

The vehicle reservation is booked at the server 110 via a user interface 116 displayed on a computing device 118. The server may be configured to interact with a plurality of vehicle access control systems for providing access control to a plurality of vehicles. The plurality of vehicle access control systems may be geographically distributed across different locations. In various embodiments, the computing device 118 can be any suitable computing device that has connection to the server 110 and can support the user interface 116. In various embodiments, the computing device 118 is the same wireless computing device 108 used by a user to access the vehicle.

In various embodiments, the vehicle access control system (e.g., vehicle access control component) is configured to receive a server update to the vehicle access control system from the wireless communication device. In various embodiments, the server update includes a new private key to the vehicle access control system. In various embodiments, communications, including vehicle reservation communications, received from the wireless communication device by the vehicle access control system for vehicle access control includes a unique increment for each message to avoid repeat message attack. In various embodiments, the unique increment is in the form of a counter and/or time stamp that indicate the uniqueness of the message to avoid a repeat message attack. In various embodiments, the vehicle access control system (e.g., vehicle access control component) is configured to communicate vehicle access control system information back to a central server, via for example a secured communication channel/protocol.

In various embodiments, the wireless communication device 106 can be tethered to the vehicle access control system (e.g., vehicle access control component) once vehicle access is provided and the vehicle access control system can tether to the various functions of the wireless communication device, such as audio, video, GPS, accelerometer, and/or other components/functions of the wireless communication device.

In various embodiments, the various functionalities of the vehicle access control system are built in the vehicle directly by the manufacturer when the vehicle is manufactured. In various embodiments, the various functionality of the vehicle access control system is integrated into a separate vehicle access kit that is coupled to the vehicle via wired or wireless communication link post manufacturing. In various embodiments, the vehicle access kit is in the form of a portable vehicle key or remote that communicates with the vehicle via short-range wireless communication link. In various embodiments, the vehicle access kit is physically coupled to the vehicle control system and communicates with the vehicle via a physical port such as a vehicle bus port.

Figure 2:
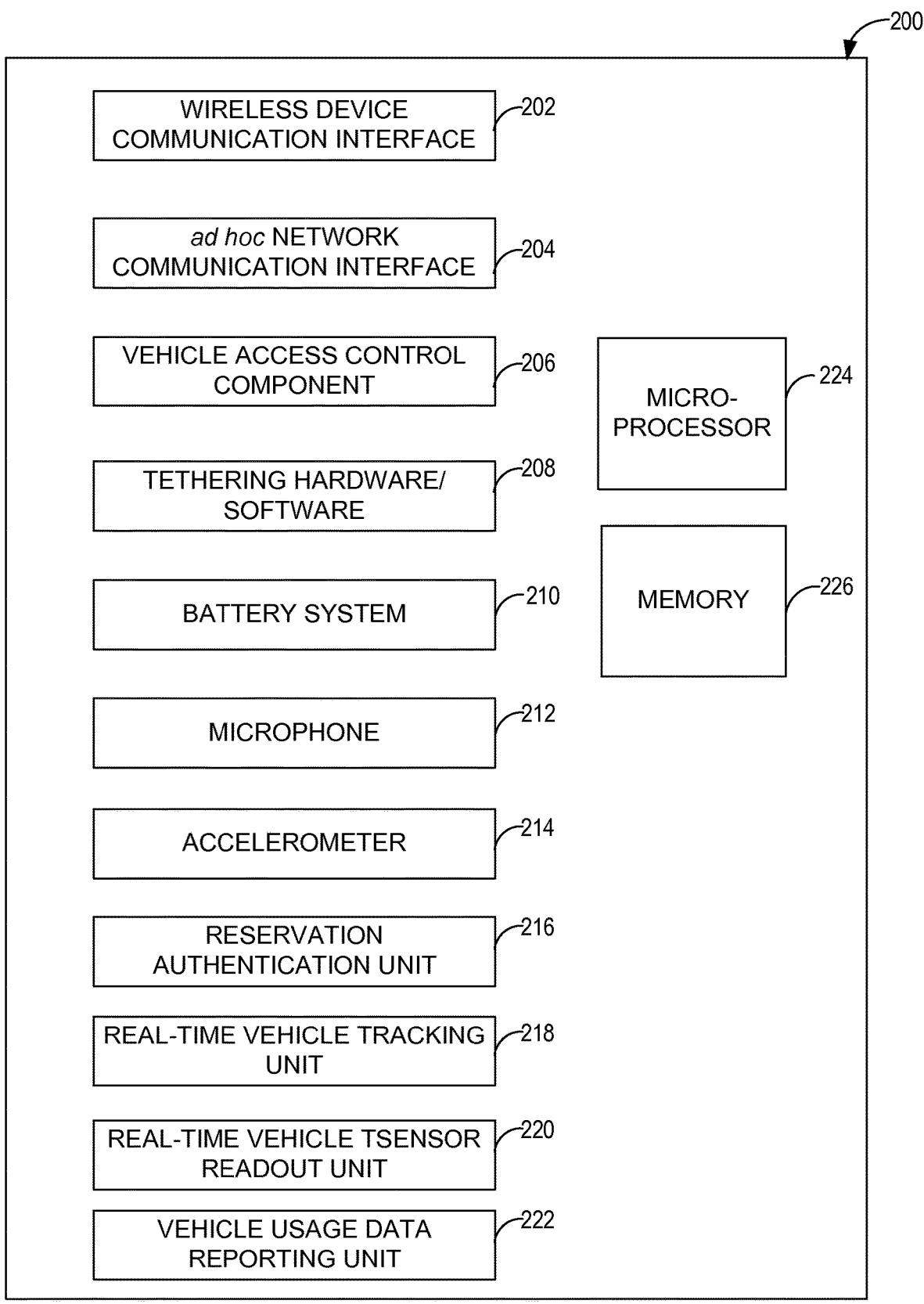
FIG. 2 is a diagram illustrating an embodiment of a vehicle access kit for providing vehicle access in accordance with some embodiments.

FIG. 2 is a diagram illustrating an embodiment of a vehicle access kit 200 for providing vehicle access in accordance with some embodiments.

In various embodiments, the vehicle access kit is built as a separate unit that can be installed into an existing vehicle. In various embodiments, the vehicle access kit specification and/or components are directly installed during production by vehicle manufacturers during manufacturing of the vehicle. In various embodiments, integration of vehicle access kit specification and/or components are installed by aftermarket providers. For example, exact hardware implementation can vary, but functionally generally requires the following components/functions: vehicle actuation interface, microprocessor, short-range transceiver, and tethering protocol. This will allow third parties to manufacture cars and devices adhering that support tethering for remote vehicle control, access control, car sharing, and a plurality of other services, such as those described herein.

In various embodiments, the vehicle access kit 200 further includes a wireless device communication interface 202 for communication with a wireless communication device.

In various embodiments, the wireless device communication interface 202 includes a short-range wireless interface (e.g., Bluetooth and/or WiFi) for two-way communication between the vehicle access kit 200 and the wireless communication device that is nearby.

In various embodiments, the wireless device communication interface 202 includes a physical adaptor such as USB interface for establishing physical/wired connection between the vehicle access kit and the wireless communication device.

In various embodiments, the vehicle access kit 200 further includes an ad hoc network communication interface 204 for communication with one or more nearby vehicles to form a mesh ad hoc network of vehicles equipped with ad hoc networking communication interface. In various embodiments, the ad hoc network communication interface uses a short-range communication protocol that allows for a longer range communication than Bluetooth and WiFi. Example of such communication protocol includes ZigBee and IEEE 802.11s.

In various embodiments, the vehicle access kit 200 includes a vehicle access control component 206 that provides access to the vehicle by for example unlocking the vehicle door and/or allowing for starting of the vehicle engine. In various embodiments, the vehicle access control component 206 emulates a key fob includes a keyless entry remote comprising integrated hardware (e.g., KeeLoq, NLSFR, and/or Keyless Go) and/or software components that is capable of synchronizing to the vehicle in an equivalent way to a standard OEM keyless remote. The keyless entry remote includes the capability to actuate (e.g., lock, unlock, start engine, adjust mirrors, and/or other functions) vehicle functions by sending a wireless signal to the car's control systems.

In various embodiments, the vehicle access control component 206 includes a physical adaptor connected to the vehicle bus of a vehicle so that it is capable of actuating car functions (e.g., unlock doors, start engine) and reading sensors (e.g., fuel gauge, odometer). In various embodiments, the vehicle access component includes a vehicle bus adaptor for communicating with a vehicle bus coupled to a vehicle controller. In various embodiments, the vehicle access component includes a CAN-bus adaptor for communicating with a vehicle CAN-bus. In various embodiments, the vehicle access component includes a LIN-bus adaptor for communicating with a vehicle LIN-bus.

In various embodiments, the vehicle access kit 200 further includes proprietary tethering firmware/software 208 that enables the vehicle access kit 200 to tether to a wireless communication device (e.g., mobile handset), either directly (e.g., through wired connection) or indirectly (e.g., wirelessly) through a vehicle ad-hoc network, and utilize the tethered device's long-range wireless connectivity (e.g., cellular and satellite), short-range wireless connectivity (Bluetooth, WiFi, 802.11s), Internet connectivity (e.g., HSDPA, WiFi) and/or various other functionalities, such as GPS for location sensing, camera, audio, and/or video functionalities. In various embodiments, the vehicle access kit additionally includes a physical external connector port, which is accessible from outside the vehicle. The will allow wired tethering without the need for a short-range wireless transceiver in the vehicle access kit and without the need for a compatible short-range wireless transceiver in the mobile handset.

In various embodiments, the vehicle access kit 200 further includes a battery system 210 for supplying power to the vehicle access kit 200 and/or for supplying power to the directly tethered wireless communication device. In various embodiments, the battery system 210 is configured to transition to a low power mode, by for example disabling the wireless communication interface, the bus adaptor, and/or enter the microprocessor into a low power mode upon transitioning into the low power mode. In various embodiments, the vehicle access kit 200 is configured to transition to the low power mode after a time-out period has passed since the vehicle engine is off, there is no communication with the wireless communication device, and it is not during a verified reservation time.

In various embodiments, the vehicle access kit 200 further includes a microphone 212 and a low power processor (e.g., a pico power processor in communication with the microphone), in which the microphone is configured to identify a sound signal based on a signature sound signal, such as a knock on a window of the vehicle to determine whether or not to transition from the lower power mode to a normal power mode. In various embodiments, the microphone 212 is a local microphone included in the vehicle access kit. For example, the microphone 212 can detect a signature signal (e.g., knock-knock on a window of the vehicle, such as a driver side automobile window double knock sound signal), and transition from a lower power mode to a normal power mode after the signature sound signal is identified.

In various embodiments, the vehicle access kit 200 further includes an accelerometer 214 for monitoring acceleration of the vehicle during one or more reservations to provide vehicle usage data. In various embodiments, the accelerometer is a local accelerometer built in the vehicle access kit. In various embodiments, the accelerometer is a tethered accelerometer created by tethering to an accelerometer of the tethered wireless communication device (e.g., tethered through wired connection or short-range wireless connection).

In various embodiments, the vehicle access kit 200 further includes a vehicle reservation verification unit 216. In some embodiments, the vehicle access kit additionally includes a public-key cryptography module for communication between the vehicle access kit and remote systems. This will avoid the man-in-the-middle attack by a potentially malicious mobile handset owner.

In various embodiments, the vehicle access kit 200 further includes a real-time location tracking system 218 for tracking vehicle's position while driving by leveraging the high-speed connectivity and GPS capabilities of a locally installed GPS or a tethered GPS of a tethered wireless computing device (e.g., mobile handset). This will allow a vehicle owner to keep tabs on where their vehicle is at any point in time.

In various embodiments, the vehicle access kit additionally includes a real-time vehicle sensor readout unit 220 for read out various sensor output of the vehicle (e.g., speed/acceleration, pedal position, air intake, altitude, temperature). In various embodiments, the real-time sensor readout unit 220 leverages the tethered functionality of a tethered wireless computing device. This will allow the user to diagnose their vehicle and for remote diagnosis of problem by technicians. In aggregate, this data will be useful to cities, governments, and any 3rd parties interested in the vehicle, traffic, and road data.

In various embodiments, the vehicle access kit includes vehicle usage data reporting unit 222 configured to report and communicate back to a central server via a nearby wireless communication device that has established wireless connection via for example a short-range wireless link with the vehicle access kit. In various embodiments, the vehicle usage data and other information are communicated back to the central server via secured communication channel/protocol. For example, the message can be wrapped in multiple layers of encryption, including a first layer encrypted using a public key of the wireless communication device which serves as a message relay intermediate and is decrypted by the wireless communication device using a private key of the wireless communication device, and a second encryption layer that is encrypted using a public key of the server and can be decrypted using the private key of the server.

In various embodiments, the vehicle access kit 200 further includes a microprocessor 224 unit (MPU) connected to the vehicle bus adapter and the short-range wireless link. It includes proprietary firmware code that enables the system to authenticate nearby mobile handsets over the short-range wireless link. If authenticated, it accepts commands (e.g., unlock doors, start engine, and/or other commands) from wireless communication device (e.g., sent through the short-range wireless link) and instructs the vehicle bus to actuate the corresponding car function.

In various embodiments, the vehicle access kit 200 further includes a memory 226 unit for storing various instructions, codes, and data information. For example, the memory can store various computer instructions to be executed by the microprocessor 206 to perform various functions of the vehicle access kit. It can include a locally stored private key for the vehicle access kit 200.

In various embodiments, the vehicle access kit 200 can also include one or more of the following features that are not shown in the figure:

Addition of Mobile Handset Dock

In some embodiments, the vehicle access kit additionally includes a physical dock and connector port for docking a wireless communication device. Power for the device is drawn from vehicle either by direct wiring or through an external plug (e.g., cigarette lighter). The will enable wired tethering through the connector port and allow the user to recharge the mobile handset while driving.

Addition of Mobile Communication Radio

In some embodiments, the vehicle access kit additionally includes a long-range mobile communication radio/interface, such as GSM radio, which can be used for wireless communication to a vehicle reservation or sharing system (e.g., as another and/or backup network communication channel). The long-range mobile communication radio/interface includes, for example, data transmission capability through the GPRS and EDGE standards. In various embodiments, the GSM radio can act as a backup long-range wireless communication medium in the event tethered long-range wireless communication through a tethered device is not possible (e.g., software/hardware incompatibility) or currently unavailable. In various embodiments, the long-range mobile communication radio/interface can be used to communicate with various components on cellular, satellite, and/or data networks Addition of a Speaker System and Open Microphone In some embodiments, the vehicle access kit additionally includes a speaker system and open microphone that interfaces with the user's mobile handset. This will give the user a hands-free speaker phone when driving.

Addition of a Monitor Screen

In some embodiments, the vehicle access kit additionally includes a screen that interfaces with the user's mobile handset. This will give the user a hands-free video phone when driving, and the ability to display rich visual media.

Enabling a Real-time Traffic Analysis and Prediction System

In some embodiments, the vehicle access kit additionally includes a real-time analysis and prediction algorithms for traffic patterns based on observations taken from real-time vehicle sensor network. This will allow real-time alerts on upcoming traffic congestion and allow the user to minimize travel time. In aggregate, this data will be useful to cities, governments, and any third parties interest in vehicle, traffic, and road data.

Addition of Automatic Door Lock Sensing

In some embodiments, the vehicle access kit additionally includes an automatic door unlocking and locking once the mobile handset leaves the short-range wireless proximity. This will give the vehicle owner an increased level of vehicle security and ensure the car doors are always locked.

Addition of Automatic Billing based on Wireless Proximity

In some embodiments, the vehicle access kit additionally includes automatic billing based on detecting when the mobile handset enters/exits the proximity of the short-range wireless transceiver on the vehicle access kit. This can be accomplished by detecting radio signal power levels. This will allow car sharing systems an automatic way of detecting when to start and stop billing for a vehicle sharing event.

Addition of an Open Platform for Integration of Other Services

In some embodiments, the vehicle access kit additionally includes an open platform for provisioning new services on the vehicle access kit by third parties. For example, this will allow an insurance provider to create personalized, lower cost insurance plans based on driving habits. As another example, this will also allow advertisers to stream ads to the car via the vehicle access kit. As yet another example, this will allow media providers to stream music to the car via the vehicle access kit. As yet another example, this will allow a maintenance provider to remotely diagnose and track vehicle health.

Addition of a RFID, Magstripe, NFC Sticker, or Bluetooth Token Reader (or equivalent identifying token)

In some embodiments, the vehicle access kit further includes a token reader to the vehicle access kit. This is used in place of the phone for authentication of the user and each user would be given a unique identifying token. Tokens could take the form of RFID keys, Magnetic Stripe cards, Bluetooth Tokens, NFC Stickers, or any equivalent devices. For devices requiring close proximity contact, the reader is mounted on the exterior of the vehicle, within or on the interior face of glass window. This enables access control based on the token identifier, and allows the user to access the vehicle using the token in cases where he/she their phone is inaccessible or out of battery.

Extension into a Generic Tethering Kit for Access Control

In some embodiments, the vehicle access kit can be extended into a generic tethering kit for any system requiring a low-cost communications, location sensing, or access control system. Applications include physical building access control systems, generic transportation kits for bikes, Segways, and/or other types of vehicles, secure payment and checkout systems, as well as any other application with similar properties. For example, instead of integrating vehicle actuation hardware (e.g., keyless go), the generic kit would support various actuation mechanisms. For physical building access control, it would integrate an electric strike or magnetic lock instead of a vehicle bus interface. This would allow the building entrance to securely tether to the mobile handset to for identity confirmation and access control by remote systems. The Generic Tethering Kit for access control works well for cases where multiple users share a single resource. The Kit can be used as a substitute for Hotel Keycard authentication. It can also be used to authenticate users into storage unit, parking structures etc.

Figure 3:
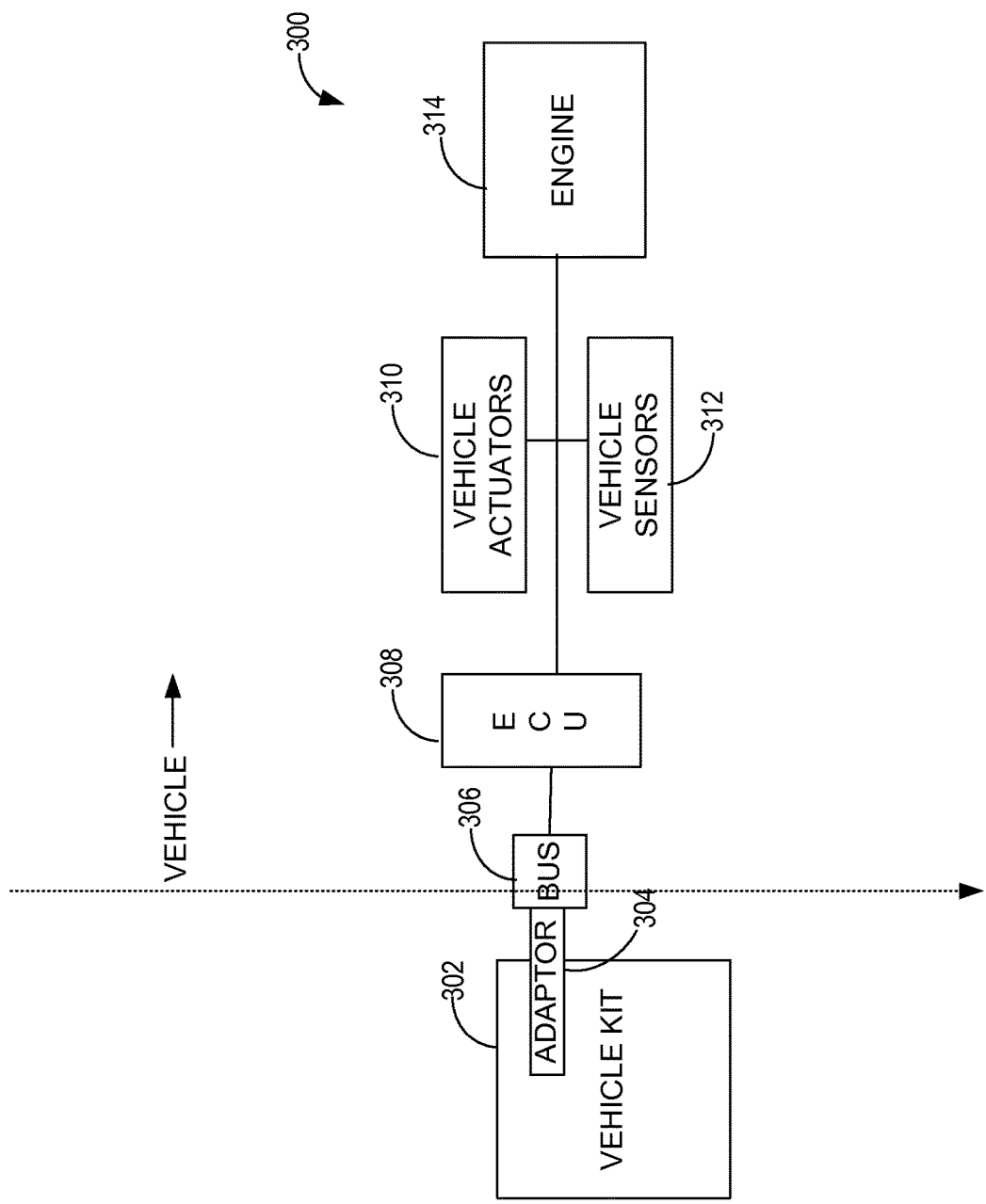
FIG. 3 is a diagram illustrating an embodiment interfacing of a vehicle access kit with a vehicle in accordance with some embodiments.

FIG. 3 is a diagram illustrating an embodiment interfacing 300 of a vehicle access kit with a vehicle in accordance with some embodiments. In the example shown, the vehicle access kit 302 is connected to a vehicle bus 306 (e.g., CAN-bus, LIN-bus) via a vehicle bus adaptor of the vehicle access kit 304. The vehicle access kit is thus connected to the engine control unit (ECU) 308 of the vehicle, which is in turn connected to various vehicle actuators 310 (e.g., accelerator pedal, brake pedal, window control, temperature control, roof control, and/or engine starter), various vehicle sensors 312 (e.g., temperature, speed, and/or acceleration sensor), and the vehicle engine 314.

Figure 4:
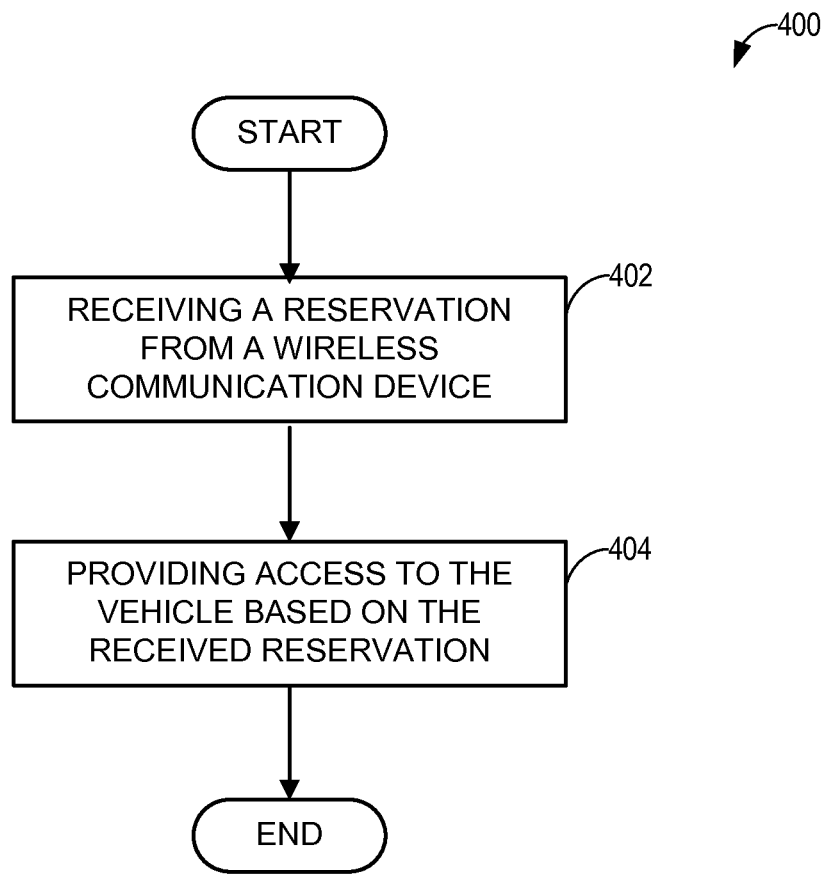
FIG. 4 is flowchart illustrating an example flow for vehicle access control in accordance with some embodiments.

FIG. 4 is flowchart illustrating an example flow for vehicle access control in accordance with some embodiments. At 402, a reservation for a vehicle is received from a wireless communication device. In various embodiments, the vehicle reservation is received via a short-range wireless communication link/protocol such as WiFi or Bluetooth connection from the wireless communication device. At 404, vehicle access is provided based on the received reservation. In various embodiments, once vehicle access is provided, the user can send commands from the wireless communication device to a vehicle access control component coupled to the vehicle to accurate various vehicle functionalities, such as open the vehicle door, turn on the engine, and/or otherwise allow the user to use the vehicle.

Figure 5:
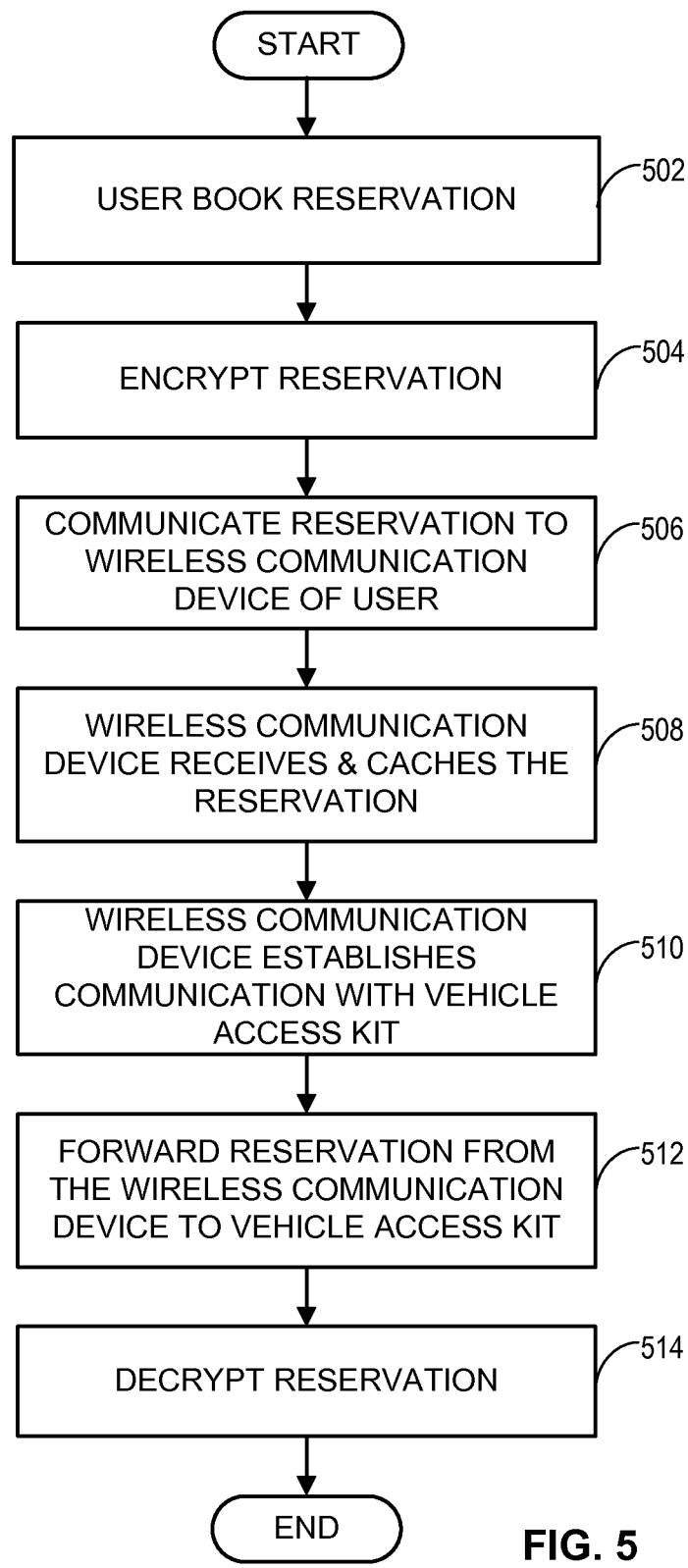
FIG. 5 is a flowchart illustrating an example flow for receiving vehicle reservation from a wireless communication device in accordance with some embodiments.

FIG. 5 is a flowchart illustrating an example flow for receiving vehicle reservation from a wireless communication device in accordance with some embodiments. At 502, a vehicle reservation is booked. In various embodiments, the vehicle reservation is booked by a user at a central server via a user interface displayed on a computing device. The computing device can be any suitable computing device that has network access and can support the user interface. In various embodiments, the computing device is the same wireless communication device the reservation is sent to. At 504, the vehicle reservation is encrypted. In various embodiments, the central server encrypts the message containing the vehicle reservation. In various embodiments, the encryption includes multiple layers. In various embodiments, the vehicle reservation is encrypted in a first layer of encryption using a public key of the wireless communication device the vehicle reservation will be sent to. The first layer of encryption can be decrypted using a private key of the wireless communication device. The vehicle reservation is further encrypted in a second layer of encryption using a public key of a vehicle access kit that provides access control to the vehicle. The second layer of encryption can be decrypted using a private key of the vehicle access kit.

At 506, the vehicle reservation is communicated to a wireless communication device of the user. In various embodiments, a central server managing vehicle reservation communicates the vehicle reservation to a wireless communication device of a vehicle user. A wired network, such as the Internet and/or a wireless network, such as cellular network that uses long-range wireless communication link/protocol, can be used to communicate the vehicle reservation. At 508, the wireless communication device receives and caches the reservation. In various embodiments, the wireless communication device decrypt the first layer of encryption encrypted using the public key of the wireless communication device using a locally stored private key of the wireless communication device. In various embodiments, decryption is used to ensure and authenticate that the intended wireless communication device is receiving the vehicle reservation rather than one that intercepts the vehicle reservation. At 510, the wireless communication device establishes a communication link with a vehicle access kit.

In various embodiments, the vehicle access kit is equipped with a short-range wireless communication interface (e.g., WiFi and/or Bluetooth). In various embodiments, when the user brings the wireless communication device close to the vehicle such that the wireless communication device is within the short-range wireless communication range of the vehicle access it. A short-range wireless communication link is established between the vehicle access kit and the wireless communication device. In various embodiments, linking is initiated automatically by the vehicle access control kit when the vehicle access control kit detects the presence of the wireless communication device within its short-range wireless communication range. In various embodiments, linking is initiated by the user by sending out command from the wireless communication device to the vehicle access kit. In various embodiments, the vehicle access kit is equipped with a physical access port (e.g., USB port) for communicating with the wireless communication device. A communication link is established when the user physically connects the wireless communication device to the vehicle access kit via the access port.

At 512, the reservation is forwarded from the wireless communication device to the vehicle access kit. In various embodiments, the vehicle reservation with its first layer of encryption stripped out is forwarded from the wireless communication device to the vehicle access kit. At 514, the vehicle access kit receives the vehicle reservation and decrypts the vehicle reservation. In various embodiments, the second layer of encryption encrypted using a public key of the vehicle access kit is decrypted using a private key of the vehicle access kit stored locally on the vehicle access kit. In various embodiments, the reservation is decrypted to verify the authenticity of the wireless communication device is the intended device for the vehicle reservation.

Figure 6:
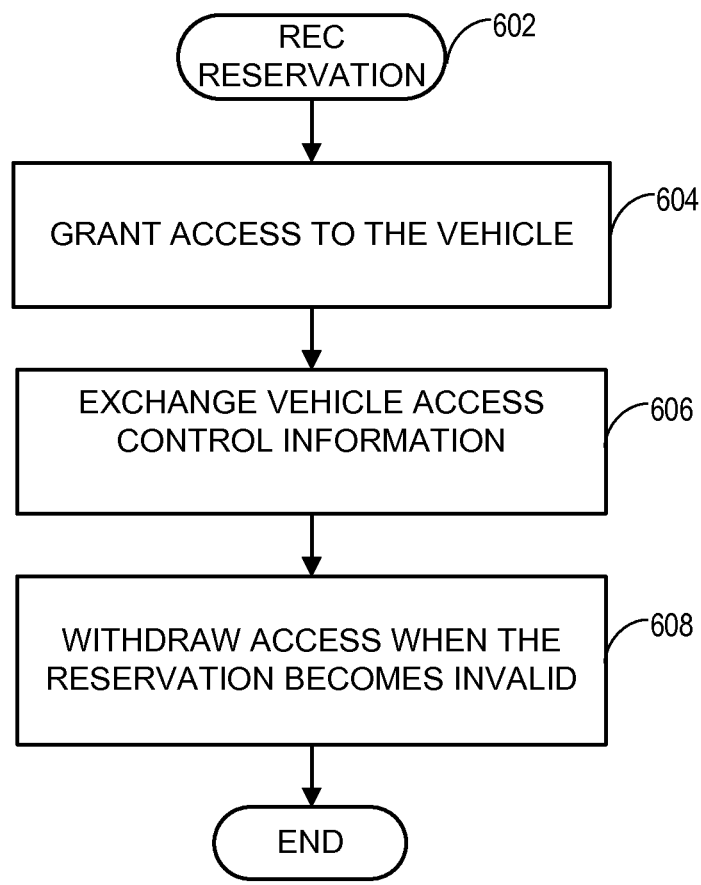
FIG. 6 is a flowchart illustrating an example process 600 for providing vehicle access when a vehicle reservation is received at a vehicle access control system in accordance with some embodiments.

FIG. 6 is a flowchart illustrating an example process 600 for providing vehicle access when a vehicle reservation is received at a vehicle access control system in accordance with some embodiments. At 602, vehicle reservation is received from a wireless communication device. In various embodiments, the vehicle reservation is decrypted and authenticated at the vehicle access control system. At 604, vehicle access is granted. In various embodiments, granting access includes opening the vehicle door, and/or allowing engine to be turned on by user. In various embodiments, the vehicle access control system begins to accept commands from the wireless communication device such as commands to open the door. In various embodiments, the vehicle access control system grants vehicle access by sending a symmetric key back to the wireless communication device. In various embodiments, the symmetric key is associated with the reservation and its validity is associated with a reservation time period of the vehicle reservation.

At 606, vehicle access control information is exchanged (e.g. received from and sent to a central server). In various embodiments, the information is exchanged via a secured communication channel/protocol. In various embodiments, exchanging vehicle access control information includes receiving information from a central server and reporting information back to the central server. In various embodiments, exchange of vehicle access control information is relayed by vehicles in an ad hoc vehicle network consisting of vehicles that are capable of ad hoc communications with one or more nearby vehicles using short-range wireless communication protocol (e.g., 802.11s and/or Zigbee). In various embodiments, trip information (e.g., location information, traffic information, emergency information, and/or accident information) is reported to a central server. In various embodiments, trip related information such as vehicle usage information is reported back to a central server periodically using the tethered wireless communication capability of the wireless communication device. In various embodiments, an update (e.g., server update) to the vehicle access control from the wireless communication device is received from the central server. In various embodiments, the server update includes a new private key for vehicle access control. In various embodiments, each message for exchanging information such as vehicle reservation and updates include a unique increment for each message to avoid repeat message attack. In various embodiments, the unique increment may be in the form of a counter and/or time stamp that indicate the uniqueness of the message to avoid a repeat message attack.

At 608, vehicle access is withdrawn when the vehicle reservation becomes invalid. In various embodiments, a time-out period elapses before vehicle access is withdrawn when the vehicle reservation becomes invalid. In various embodiments, the vehicle reservation becomes invalid at the end of the vehicle reservation period. In various embodiments, the vehicle reservation becomes invalid when the wireless communication device is removed from the communication range of the vehicle access control system, for example when the wireless communication device is removed from physical or wireless communication with the vehicle wireless communication device. In various embodiments, the vehicle access control system periodically communicates with the wireless communication device to verify that the authentic wireless communication device is in communication with the vehicle access control system by verifying the symmetric key of the wireless communication device.

Figure 7:
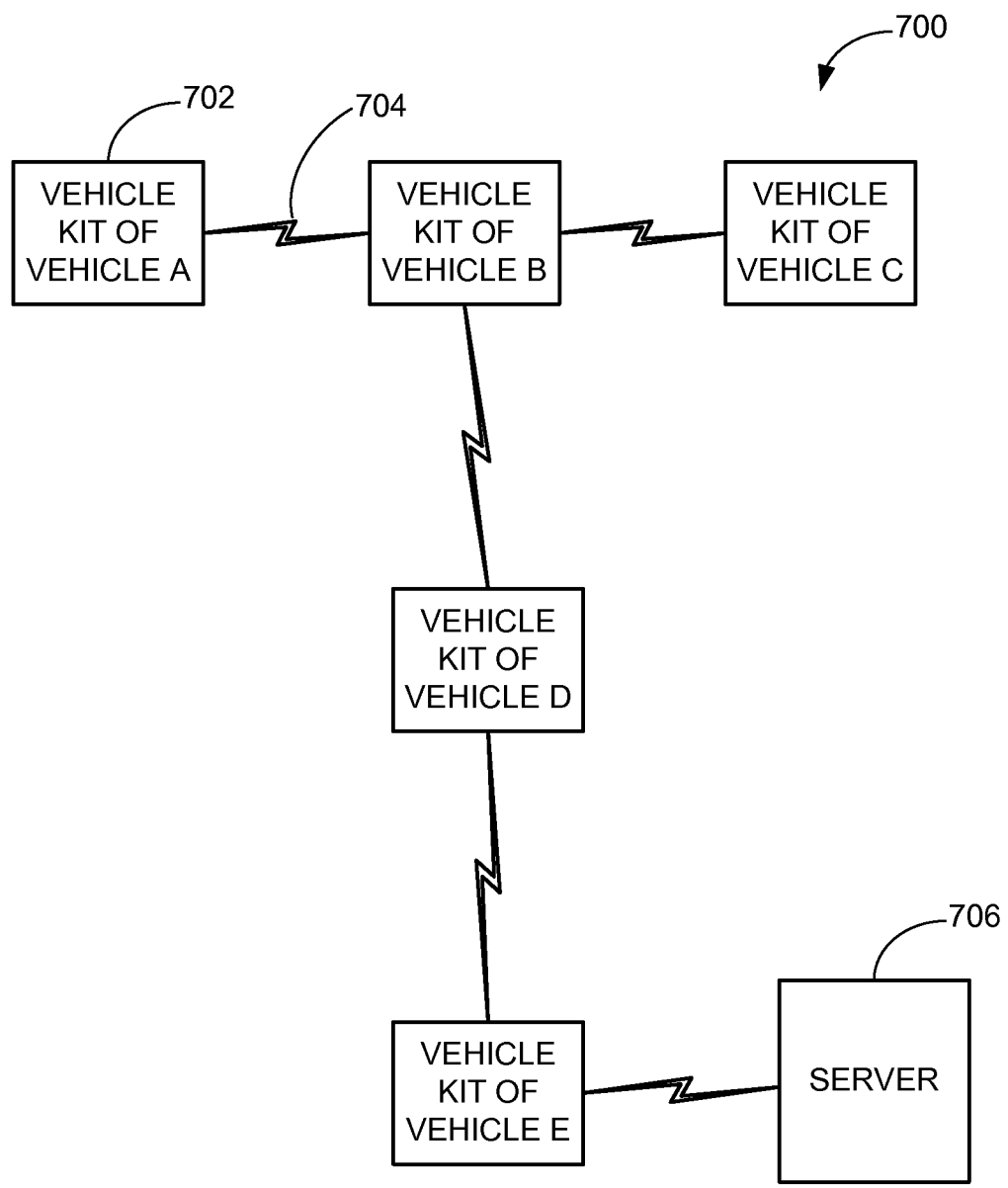
FIG. 7 is a diagram illustrating an ad hoc network that includes vehicles installed with vehicle access control system in accordance with some embodiments.

FIG. 7 is a diagram illustrating an ad hoc network 700 that includes vehicles 702 installed with vehicle access control system in accordance with some embodiments. In various embodiments, each vehicle access control system is configured to communicate with vehicle access control systems of nearby one or more nearly vehicles in the mesh network of vehicles using a wireless communication links 704. In various embodiments, wireless communication links having communication range that is in longer than WiFi and Bluetooth but shorter than long-range wireless communication link such as cellular and satellite wireless communication links are used for ad hoc networking. In various embodiments, a vehicle access control system relays vehicle access control information such as new private key to a vehicle access control component and trip information such as location information such as road condition and traffic related information such as emergency and accident information to the one or more nearby vehicles in the mesh network as they come into the communication range and establishes communication links with the vehicle access control system. In various embodiments, information from each vehicle access control system in the mesh network is relayed to a central server 706 via the ad hoc network.

Figure 8:
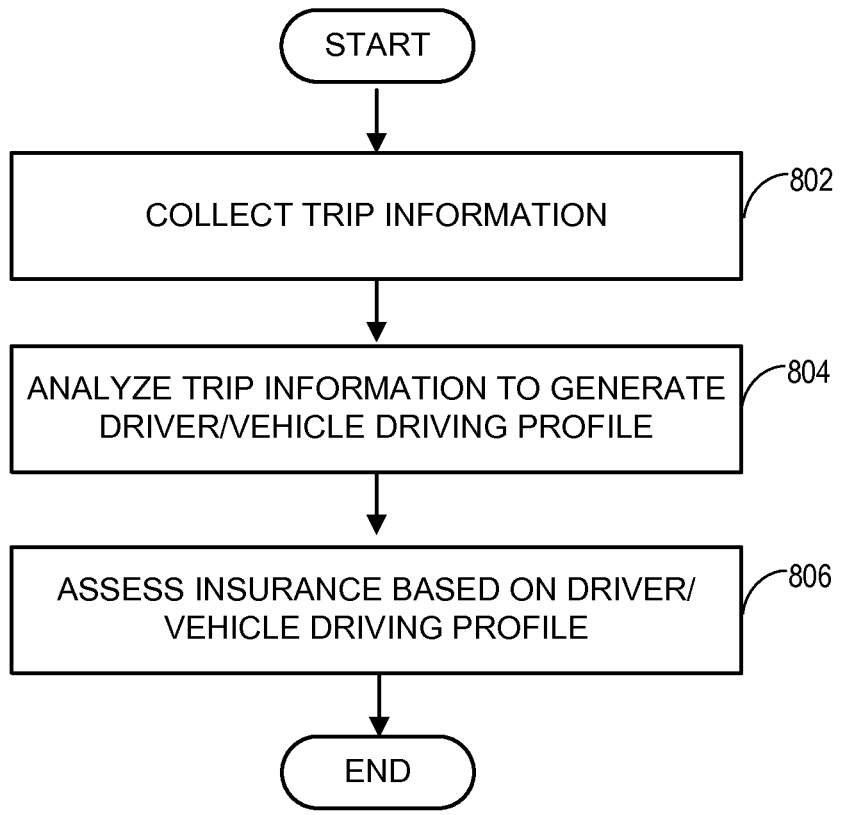
FIG. 8 is a flowchart illustrating an embodiment of a process for providing pay-as-you-drive (PAYD) insurance using information collected using the vehicle access control system in accordance with some embodiments.

FIG. 8 is a flowchart illustrating an embodiment of a process for providing pay-as-you-drive (PAYD) insurance using information collected using the vehicle access control system in accordance with some embodiments. At 802, trip information is collected. In various embodiments, trip information includes for example vehicle speed and acceleration profile and vehicle location information. In various embodiments, the trip information is reported back to a central server from the vehicle' access control system of the vehicle used in the trip. In various embodiments, the trip information is reported back to the central server via for example the tethered long range wireless communication interface of a wireless communication device tethered to the vehicle access control system. In various embodiments, the trip information is included in a secured communication or message. In various embodiments, the secured communication is wrapped in multiple layers of encryption. In various embodiments, the encryption includes a first layer (e.g., outer most layer) encrypted using a public key of a wireless communication device the message is routed through and a second layer is encrypted using a public key of the destination server of the communication. In various embodiments, a vehicle access control system coupled to the vehicle used during the trip sends the encrypted communication including the trip information first to the wireless communication device. The wireless communication device decrypts the first layer (e.g., outer most layer) of the secured communication using a locally stored private key of the wireless communication device. The wireless communication device then sends the secured communication with its first layer of encryption stripped to the destination server. The destination server decrypts the communication using a locally stored private key of the destination server.

At 804, trip information is analyzed to generate driver driving profile and/or car driving profile. In various embodiments, the trip information is associated with driver of the car and/or the owner of the car. In one example, the identity of the wireless communication device is used to identify the driver and the identity of the vehicle access control system is used to identify the vehicle and the owner of the vehicle. At 806, insurance is assessed based on the driver/vehicle driving profile. In various embodiments, the insurance is a pay-as-you-drive (PAYD) insurance that can be offered for a particular trip. In various embodiments, the insurance is assessed against the driver or user of the vehicle. In various embodiments, the insurance is assessed against the owner of the vehicle. In one example, the driving profile associated with a particular driver can be used to assess insurance for future trips of the driver. Driver with safer driving profile will be assessed a lower insurance rate. In another example, the driving profile associated with all the drivers of a particular vehicle can be used in the future to assess insurance for future trips of the vehicle against the owner of the vehicle. Vehicle owner that rents out vehicle to drivers with safer driving profiles in the past will be assessed a lower insurance rate.

In some embodiments, techniques described herein provide one or more of the following advantages, as described below. The most expensive components in typical AVL hardware systems are the long-range wireless communications and GPS hardware. By tethering to a smart phone (or equivalent mobile computing devices) in close proximity, the vehicle access control kit can be constructed at much lower cost. Most AVL systems use either satellite or cellular telemetry. In both cases, over-the-air access charges are incurred on a monthly basis. Satellite data transmission is extremely expensive and suffers high latency. Cellular transmission requires paying a monthly system access fee and per-Kb or per-SMS charges for each query. By contrast, most smart phones (or equivalent device) have bulk data transmission plans that are being paid by the smart phone owner. Tethering to a smart phone in close proximity means the vehicle access kit can leverage the smart phone's data plan and avoid any monthly fees for system access and data transmission. By removing the need for complicated long-range wireless and GPS chipsets, the vehicle access kit complexity is reduced. Maintaining long-range wireless connectivity and a GPS lock implies a tremendous amount of complexity, particularly in the presence of limited power when the vehicle ignition if off. The use of tethering erases these requirements. This means the vehicle access kit design is much more resilient with fewer components that need to be supported. The use of tethering insulates the vehicle access kit to the rapid advances in cellular technology. Once the tethered to a wireless communication device, the vehicle access kit gets full the capability of the smart phone. For example, tethering a 4G smart phone gives the vehicle access kit 4G cellular networking capabilities and enhanced GPS accuracy. Most AVL hardware systems have battery issues. Maintaining a cellular radio connection, or a satellite connection, and a GPS lock requires a significant amount of power. For that reason, AVL hardware systems require a separate battery unit. By supporting only short-range wireless communication (e.g., Bluetooth Low Energy) designed for low power environments, the vehicle access kit can run off the vehicle battery without risk of depleting it if the car ignition is off for an extended period of time.

By integrating keyless remote hardware into the vehicle access kit, installation is simplified. As this avoids any physical wires into the vehicle bus, the vehicle access kit can be installed by anyone with access to the car and no longer requires a skilled technician. This has the added benefit of ensuring no insurance provisions are violated by installing aftermarket hardware in the vehicle.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vehicle access control system, comprising:
   a personal wireless device of a driver, wherein the personal wireless device performs the following operation:
      decrypt a first layer of encryption of a vehicle reservation using a first private key for the personal wireless device;
   a processor of a vehicle access kit, wherein the processor performs the following operations:
      receive the vehicle reservation at a communication interface of the vehicle access kit from the personal wireless device of the driver, wherein the communication interface includes a wireless communication interface that communicates with the personal wireless device via a short-range point-to-point wireless communications link, wherein the vehicle reservation includes a plurality of layers of encryption at a central server, wherein the plurality of layers of encryption includes the first layer of encryption and a second layer of encryption, wherein the first layer of encryption is encrypted using a first public key for the personal wireless device, wherein the first public key and the first private key are associated with each other, and wherein the second layer of encryption is encrypted using a second public key for the vehicle access kit;
      decrypt the second layer of encryption of the vehicle reservation received from the personal wireless device via the short-range point-to-point wireless communications link at the vehicle access kit using a second private key for the vehicle access kit to authenticate the vehicle reservation, wherein the second public key and the second private key are associated with each other;
      provide the driver access to a vehicle upon authentication of the vehicle reservation using a vehicle access control component; and
      withdraw the driver access to the vehicle when the vehicle reservation becomes invalid, wherein the vehicle reservation is invalid after expiration of a reservation time period associated with the vehicle reservation, when the personal wireless device of the driver is out of a wireless communication range of the vehicle access kit, or a combination thereof; and
   a memory of the vehicle access kit coupled to the processor and configured to provide the processor with instructions.

2. The vehicle access control system recited in claim 1, wherein the vehicle reservation includes a reservation for a specified time period.

3. The vehicle access control system recited in claim 1, wherein the vehicle reservation includes a reservation time slot and vehicle identifier identifying the vehicle.

4. The vehicle access control system recited in claim 1, wherein the vehicle reservation includes a vehicle rental reservation.

5. The vehicle access control system recited in claim 1, wherein the vehicle reservation includes an unlimited time period for access to the vehicle.

6. The vehicle access control system recited in claim 1, wherein the vehicle reservation is shared among members of a group or entity.

7. The vehicle access control system recited in claim 1, wherein the processor further performs the following operation: send the vehicle reservation via a long-range wireless communications link from a data network to the personal wireless device.

8. The vehicle access control system recited in claim 7, wherein the long-range wireless communication link is selected from the group consisting of GSM, SMS, UTMS, HSDPA, and LTE.

9. The vehicle access control system recited in claim 1, wherein the vehicle reservation is included in a verified communication.

10. The vehicle access control system recited in claim 1, wherein the vehicle reservation is included in an encrypted communication.

11. The vehicle access control system recited in claim 1, wherein the short-range point-to-point wireless communication link is selected from the group consisting of Bluetooth and WiFi.

12. The vehicle access control system recited in claim 1, wherein the communication interface comprises a physical access port adapted to communicate with the personal wireless device via a wired connection.

13. The vehicle access control system recited in claim 1, wherein the vehicle access control system communicates a symmetric key back to the personal wireless device.

14. The vehicle access control system recited in claim 13, wherein the symmetric key is associated with the vehicle reservation and its validity term is associated with a reservation time period of the vehicle reservation.

15. The vehicle access control system recited in claim 1, wherein the processor further performs the following operation: receive an update to the vehicle access kit from the personal wireless device.

16. The vehicle access control system recited in claim 15, wherein the update includes a new private key for the vehicle access kit.

17. The vehicle access control system recited in claim 1, wherein the vehicle access control component emulates a key fob.

18. The vehicle access control system recited in claim 1, wherein the vehicle access control component includes a vehicle bus adaptor for communicating with a vehicle bus coupled to a vehicle controller.

19. The vehicle access control system recited in claim 18, wherein the vehicle access control component includes a CAN-bus adaptor for communicating with a vehicle CAN-bus.

20. The vehicle access control system recited in claim 18, wherein the vehicle access control component includes a LIN-bus adaptor for communicating with a vehicle LIN-bus.

21. The vehicle access control system recited in claim 1, wherein the processor further performs the following operation: deny access to the vehicle using the vehicle access control component when the personal wireless device loses communication with the vehicle access kit.

22. The vehicle access control system recited in claim 1, wherein the processor further performs the following operation: tether the vehicle access kit to a long-range wireless communication interface of the personal wireless device for tethered wireless network access.

23. The vehicle access control system recited in claim 22, wherein the tethered wireless network access provides for automatic tracking of geographical location of the vehicle.

24. The vehicle access control system recited in claim 1, wherein the vehicle access control system further includes the central server configured to advertise a vehicle reservation using a social network site, wherein the advertised vehicle reservation includes geolocation information.

25. The vehicle access control system recited in claim 1, further comprising an accelerometer for monitoring acceleration of the vehicle during one or more trips, wherein the processor further performs the following operation: monitor acceleration of the vehicle during one or more trips to provide vehicle usage data and report the vehicle usage data periodically to the central server.

26. The vehicle access control system recited in claim 25, wherein the accelerometer is a tethered accelerometer that is tethered to an accelerometer of the personal wireless device.

27. The vehicle access control system recited in claim 26, wherein the system is configured to associate the vehicle usage data to one or more vehicle users and communicate the vehicle usage data associated with the one or more vehicle users to an insurance agency for offering pay-as-you-drive insurance based on the vehicle usage data.

28. The system recited in claim 1, wherein the processor further performs the following operation: communicate with a data network via long-range wireless communication protocol using a GSM radio of the vehicle access kit.

29. The system recited in claim 1, wherein the processor further performs the following operation: identify a sound signal based on a signature sound signal protocol using a microphone of the vehicle access kit, wherein the vehicle access kit further includes a battery system for supplying power to the vehicle access kit, and wherein the battery system of the vehicle access kit transitions from a low power mode to a normal power mode after the signature sound signal is identified.

30. A method for vehicle access control, comprising:
  decrypting, using a personal wireless device, a first layer of encryption of a vehicle reservation using a first private key for the personal wireless device;
  receiving the vehicle reservation at a communication interface of a vehicle access kit from the personal wireless device of a driver, wherein the communication interface includes a wireless communication interface that communicates with the personal wireless device via a short-range point-to-point wireless communications link, wherein the vehicle reservation includes a plurality of layers of encryption at a central server, wherein the plurality of layers of encryption includes the first layer of encryption and a second layer of encryption, wherein the first layer of encryption is encrypted using a first public key for the personal wireless device, wherein the first public key and the first private key are associated with each other, and wherein the second layer of encryption is encrypted using a second public key for the vehicle access kit;
  decrypting the second layer of encryption of the vehicle reservation received from the personal wireless device via the short-range point-to-point wireless communications link at the vehicle access kit using a second private key for the vehicle access kit to authenticate the vehicle reservation, wherein the second public key and the second private key are associated with each other;
  providing the driver access to the vehicle after authenticating the vehicle reservation using a vehicle access control component; and
  withdrawing the driver access to a vehicle when the vehicle reservation becomes invalid, wherein the vehicle reservation is invalid after expiration of a reservation time period associated with the vehicle reservation, when the personal wireless device of the driver is out of a wireless communication range of the vehicle access kit, or a combination thereof.

31. The method recited in claim 30, wherein the vehicle reservation includes a reservation time slot and vehicle identifier identifying the vehicle.

32. The system recited in claim 1, wherein the vehicle access kit further includes a battery system for supplying power to the vehicle access kit, and wherein the battery system of the vehicle access kit transitions from a normal power mode to a low power mode after a time-out period has passed since turning off an engine of the vehicle, after there is no communication with the personal wireless device, after the vehicle reservation has become invalid, or any combination thereof.

33. The system recited in claim 1, wherein the processor further performs the following operations:
  detect when the personal wireless device enters and exits a proximity of the short-range point-to-point wireless communication link of the vehicle access kit; and
  determine when to start and stop billing for a vehicle sharing event based on detecting when the personal wireless device enters or exits within a proximity of the short-range point-to-point wireless communication link of the vehicle access kit.

34. The system recited in claim 1, wherein the secure communication channel includes secure communications between the vehicle access kit and the personal wireless device including a plurality of messages, each message of the plurality of messages including a unique increment, each unique increment relates to a counter and a timestamp.

35. The system recited in claim 1, wherein the secure communication channel includes secure communications between the vehicle access kit and the personal wireless device including a plurality of messages, the plurality of messages including a first message and a second message, the first message including a first unique increment, the second message including a second unique increment, the first unique increment and the second unique increment both relate to a counter and a timestamp.

36. The system recited in claim 1, wherein the processor further performs the following operation: receive a new second private key from the central server to authenticate new vehicle reservations encrypted using a new second public key, wherein the new second public key and the new second private key are associated with each other.

* * * * *